US008371361B2

(12) United States Patent
Stumpfl (10) Patent No.: US 8,371,361 B2
(45) Date of Patent: Feb. 12, 2013

(54) CONNECTING DEVICE (76) Inventor: Reinhold Stumpfl, Wallern (AT)

( * ) Notice: Subject to any disclaimer, the term of this patent is extended or adjusted under 35 U.S.C. 154(b) by 439 days.

(21) Appl. No.: 11/921,053

(22) PCT Filed: May 23, 2006

(86) PCT No.: PCT/AT2006/000209
§ 371 (c)(1),
(2), (4) Date: Aug. 12, 2009

(87) PCT Pub. No.: WO2006/125236
PCT Pub. Date: Nov. 30, 2006

(65) Prior Publication Data
US 2009/0293239 A1 Dec. 3, 2009

(30) Foreign Application Priority Data

May 23, 2005 (AT) .................................. A 872/2005
Mar. 15, 2006 (AT) .................................. A 426/2006

(51) Int. Cl.
A47H 3/00 (2006.01)
(52) U.S. Cl. ........ 160/382; 160/383; 160/371; 160/401; 160/403; 24/693
(58) Field of Classification Search .................. 160/371, 160/382, 383, 401, 403, 379, 381; 24/674, 24/693
See application file for complete search history.

(56) References Cited

U.S. PATENT DOCUMENTS

| 10,679 | A | * | 3/1854 | Daugherty | 12/133 R |
|---|---|---|---|---|---|
| 972,299 | A | * | 10/1910 | Valkenburg | 160/381 |
| 1,202,372 | A | * | 10/1916 | Foner | 24/675 |
| 1,776,285 | A | * | 9/1930 | Herbest | 160/44 |
| 1,945,106 | A | * | 1/1934 | Blackwell | 160/383 |
| 1,981,345 | A | * | 11/1934 | Carr | 24/674 |
| 2,134,037 | A | * | 10/1938 | Fenton | 24/674 |
| 2,441,573 | A | * | 5/1948 | Huelster | 24/674 |
| 2,567,891 | A | * | 9/1951 | Murphy | 24/674 |
| 2,632,222 | A | * | 3/1953 | Becker | 24/674 |
| 2,648,885 | A | * | 8/1953 | Jones | 24/681 |
| 2,673,382 | A | * | 3/1954 | Murphy | 24/674 |
| 3,243,858 | A | * | 4/1966 | Melanson | 24/693 |
| 3,349,452 | A | * | 10/1967 | Green | 24/674 |

(Continued)

FOREIGN PATENT DOCUMENTS

| BE | 1 003 554 | 4/1992 |
|---|---|---|
| DE | 1 184 131 | 12/1964 |

(Continued)

OTHER PUBLICATIONS

English translation of International Preliminary Report on Patentability and Written Opinion of the International Searching Authority (IPRP).

Primary Examiner — Katherine w Mitchell
Assistant Examiner — Marcus Menezes
(74) Attorney, Agent, or Firm — Collard & Roe, P.C.

(57) ABSTRACT

The invention relates to a connecting device (1) for connecting a first part having the connecting device (1) to a second part comprising a latching part (3) with a base (6) on which at least one side wall (8) is disposed and which is configured for engaging receipt of a mating part disposed on the second part. A connecting element (2) made of a weldable polymer is disposed on the base (6) and/or on the at least one side wall (8).

11 Claims, 5 Drawing Sheets

U.S. PATENT DOCUMENTS

| | | | |
|---|---|---|---|
| 3,494,405 A | | 2/1970 | Sandahl et al. |
| 3,830,278 A | * | 8/1974 | Packer .......................... 160/378 |
| 3,913,598 A | * | 10/1975 | Glutting et al. ............... 135/152 |
| 4,438,800 A | * | 3/1984 | Hemmerle et al. ........... 160/371 |
| 4,674,213 A | * | 6/1987 | Keithley ........................ 40/603 |
| 4,798,019 A | * | 1/1989 | Sury et al. .......................... 43/1 |
| 4,860,814 A | * | 8/1989 | Vilmann et al. .............. 160/381 |
| 4,926,893 A | * | 5/1990 | Klopfenstein et al. ........ 135/157 |
| 5,101,541 A | * | 4/1992 | Watanabe ........................ 24/674 |
| 5,207,262 A | * | 5/1993 | Rushford ...................... 160/354 |
| 5,275,224 A | * | 1/1994 | Morris .......................... 160/327 |
| 5,357,659 A | | 10/1994 | Ackermann |
| 5,414,950 A | * | 5/1995 | Johnson, Sr. ....................... 43/1 |
| 5,613,544 A | * | 3/1997 | Schaefer ....................... 160/395 |
| 5,642,558 A | * | 7/1997 | Bodkin, Sr. ..................... 24/674 |
| 5,992,498 A | * | 11/1999 | Boston .................... 160/370.22 |
| 6,032,433 A | * | 3/2000 | Hatziathanasiou ........ 52/742.12 |
| 6,067,694 A | * | 5/2000 | Candotti ......................... 24/662 |
| 6,546,571 B2 | * | 4/2003 | Samelson ......................... 4/558 |
| 6,895,701 B1 | * | 5/2005 | Ocampo et al. ............. 38/102.1 |
| 7,673,666 B2 | * | 3/2010 | Fan ............................ 160/84.04 |

FOREIGN PATENT DOCUMENTS

| | | |
|---|---|---|
| DE | 1 274 393 | 8/1968 |
| DE | 20 2004 015 008 | 12/2004 |
| EP | 0 891 723 | 1/1999 |
| JP | 2002-244209 | 8/2002 |
| WO | WO 03/104888 | 12/2003 |

* cited by examiner

CONNECTING DEVICE

CROSS REFERENCE TO RELATED APPLICATIONS

This application is the National Stage of PCT/AT2006/000209 filed on May 23, 2006 which claims priority under 35 U.S.C. §119 of Austrian Application No. A 872/2005 filed on May 23, 2005, and Austrian Application No. A 426/2006 filed on March 15, 2006. The international application under PCT article 21(2) was not published in English.

The invention relates to a connecting device for connecting a first part having the connecting device to a second part comprising a latching part with a base on which at least one side wall is disposed and which is configured for engaging receipt of a mating part disposed on the second part, a surface element, in particular a screen fabric, a projection screen, a screen, a canvas having a surface consisting at least partially of at least one plastic on which at least one connecting device is disposed, as well as a method for disposing a connecting device on a surface element, in particular a screen fabric, a projection screen a screen, a canvas, having a surface of at least one plastic, whereby the connecting element is connected non-positively to the surface as well as a device for reproducing projected images, comprising at least one surface element comprising a surface element front side and a surface element rear side, comprising a surface which is formed at least partially from a plastic on which at least a part of at least one connecting device is disposed, at least one frame system formed from profile elements, comprising a frame system front side, a frame system rear side and at least one frame system side surface.

Connecting devices, in particular press studs, on surface elements which are in particular made of plastic, are frequently exposed to large loads, in particular the tear-out strength plays an important role. The frequent weak point in this case is the connecting point between the surface fabric-like element and the connecting device, particularly if the connecting device is fastened to this element by incorporating a material weakening such as, for example, a hole or an opening, as is particularly the case with press studs. A press stud is a closure means consisting of two mostly small round metal or plastic parts, of which one is provided with a recess and the other is provided with a matching head. They are attached on opposite sides of a surface element, e.g. a fabric or material by hammering, for which the material of the surface element needs to be cut through and are pressed into one another for closing. Large tensile and shear forces occur, inter alia, especially at the connecting points with a surface element, as a result of which the surface element can be at least partially destroyed, for example, ripped so that the push stud loses its hold in the surface element.

Thus, for example, a projection screen is known from DE 20 2004 015 008 U1 which consists of a frame composed of rods and a projection surface consisting of an elastically resilient fabric or a film, inserted therein under tension, wherein the projection surface is fastened in the frame under tension by means of press studs and wherein the rods are designed as profile rods and the frame-side part of the press studs is inserted dispaceably in their groove. In this design the projection surface must be cut through by hammering the press studs, which results in the greater susceptibility of the projection surface to destruction which has already been described.

It is the object of the present invention to provide a connecting device which does not require the punching of rivets, eyes etc. through surface elements, e.g. screen fabrics, canvas.

The object of the invention is achieved independently in each case by providing a connecting element made of a weldable polymer on the base and/or on the at least one side wall, further by a surface element in which the connecting device is welded to the at least one plastic of the surface element, by a method whereby the non-positive connection of the connecting device to the surface element is made by welding and by a further part of the connecting device (1) which cooperates with the first part in the connected state, being disposed on the frame system rear side (22) and/or on the frame system side surface(s) (23), or by the first part of the connecting device (1) being disposed on the surface element rear side (25) and the further part of the connecting device (1) being disposed at least partially on the surface element rear side (25).

An advantage of the connecting device according to the invention is that by using a connecting element which can be welded to the plastic of the surface element, the forces which occur can be led off into a larger area, i.e. the entire welding point, which can usually be many times larger than the connecting surface in a conventional press stud, so that the surface loading decreases. Thus, additional battens are no longer required in the connecting region, by which means a greater tear-out strength is produced at the present time, so that not only production time is saved and therefore the cycle time or productivity can be increased but a visually more attractive and therefore more saleable product can thus be achieved. It is also advantageous when configuring the surface element as a projection surface that this can be used right up to the supporting frame since the usually rearward fastening connection in relation to a projection surface cannot be perceived on the projection surface. In addition, the efficiency of the manufacturing process of the surface element is increased by the method according to the invention since the arrangement of the connecting element can be carried out in an automated manner at least for the most part. In addition, a realignment of the connecting device on the surface element can optionally be carried out by simple heating of the connecting element so that incorrectly placed connecting devices can subsequently be correctly positioned. The repair of broken connecting device is thus simplified by again heating the connecting device, i.e. its connecting element, to an elevated temperature so that this can be removed from the surface element and replaced by a new connecting device.

According to one embodiment of the invention, it is provided that the polymer of the connecting element is selected from a group comprising polyethlyene, polypropylene, polyvinyl chloride, polymethacrylate, polystyrene, acrylate ester, cellulose ester, polyamide, polycarbonate and thermoplastic elastomers. Due to the weldability of these materials, it is possible to make a very permanent connection with the surface element, wherein a polymer is particularly preferably selected whose properties at least approximately correspond to that of the polymer of the surface element, in particular is made of the same material.

It is also possible that the base of the connecting device has at least one opening into which the connecting element at least partly projects, wherein according to a further embodiment, it can be provided that the connecting element projects through the opening of the base and projects. Herein and in the possibility according to another further development whereby a part of the connecting element projecting beyond the base in the direction of the side wall has a greater diameter than the opening of the base, for example, is configured as mushroom-shaped or nail-shaped, it is achieved that the latching part is connected to the connecting element in the manner of a hooking, with the result that the tear-out strength of the latching part in relation to the connecting element can be improved and in addition, forces acting on the latching part can be distributed over a larger area.

It can further be provided that the side wall has a protrusion, for example, is configured to be stepped, beyond which the connecting element does not project laterally or only partially projects. This results in a better connection of the side wall to the connecting element, which contributes to a permanent and good dissipation of the forces during frequent opening and closing processes.

In a further development, the connecting element covers the side wall at least as far as into the region of the protrusion; according to a further development, the connecting element cannot laterally project beyond the protrusion or can only partially project beyond this and furthermore, on its inner surface the connecting element can have a surface shape complementary to the stepped protrusion. With these embodiments, an individual adaptation can be made to the areas of application required in each case.

A further variant provides that a reinforcing element is disposed on the base, opposite to the side wall which preferably consists of a metal material. At the same time, it can be provided that the reinforcing element is fastened partially at a distance from the base to form an, in particular groove-shaped, recess on said base and that the connecting element engages in the recess. Thus, on the one hand a reinforcement of the connecting device is achieved per se or in turn the tear-out strength of the connecting element from the latching element is increased due the engagement in this groove-shaped recess between reinforcing element and latching part.

A further variant provides that the reinforcing element is configured to be plate-shaped or the reinforcing element can have wing-like extensions in which at least one opening or one recess is disposed in order on the one hand to provide a large area for the aforementioned reasons and on the other hand, to configure the connecting device to be as flat as possible so that this does not protrude on the surface element as far as possible.

It is also feasible that an adapter piece is disposed on the connecting element) for the disposal, in particular at a distance, of the connecting element on the base and/or the side wall of the latching, this adapter piece preferably being disposed between the connecting element and the latching part. The adapter piece makes it possible to make the latching part and the connecting means of very different materials which optionally would not have sufficient adhesion to one another without an adapter piece.

In a further embodiment it is provided for this purpose that the adapter piece has a recess for receiving a further fastening means, e.g. a clip, a hook-shaped element or the like for which this adapter piece can have, for example, an at least approximately U-shaped cross-section, wherein the recess is formed by the holding of the connecting element at a distance from the base of the latching part. This recess can be a continuous opening so that, for example, the hook-shaped elements project through this opening and hook on at least one side of the adapter piece. By this means, the connecting device according to the invention is flexibly usable since other connecting methods or connecting elements can alternatively also be used.

In order to increase the tear-out strength, the adapter piece can engage in the recess formed between the reinforcing element and the base of the latching part.

A further variant provides that the adapter piece has at least one recess in which the latching part can be inserted, with the result that not only the connection between the latching part and the adapter piece can be improved but also the overall height of the connecting device can be reduced or kept small. In addition, a saving of material in the connecting device can thus be achieved.

According to a further development of the invention, the adapter piece can consist of a different polymer from the connecting element so that materials of different hardness can be used for the adapter piece and the connecting element in order to thereby improve the mechanical strength of the connecting device.

It is thereby possible that the polymer of the connecting element has a lower hardness compared to the polymer of the adapter piece with the result that good adaptability to the film-like surface element is possible and in addition, the connecting device has a corresponding intrinsic stiffness.

According to a further development, it is provided that the latching part is configured as a press stud lower portion so that proven connecting techniques can be used. The latching part can, however, also be configured as a hook, head-shaped, polygonal etc.

A further variant provides that the latching part consists of a metal material so that frequent opening and closing is possible.

At least one wing-shaped extension can be formed on the connecting element and at least one opening or one recess can be disposed in the at least one wing-like extension. An optimised incorporation of the connecting element into the surface element and a lower overall height are advantageous as a result.

According to one embodiment, the connecting element can be connected to the surface by high-frequency or ultrasound welding so that the thermal loading of the surface element can be kept as low as possible and the risk of combustion of the plastic of the surface of the surface element can be minimised.

A further variant provides that the connecting element is formed on the surface with a tool-specific embossing in order to thus achieve a type of hooking effect and in consequence, a firmer connection of the connecting element to the plastic of the surface element.

According to one embodiment of the surface element, the surface can be configured to be multi-layered at least in the area of the connecting device in order to further increase the tear-out strength of the connecting.

The embossing can be configured as knurling with radial webs so that the hooking effect discussed above comes to bear in all directions of the surface.

According to the method, the welding connection can be made by high-frequency or ultrasonic welding, in which case the thermal loading of the surface element can be kept as low as possible and the risk of combustion of the plastic of the surface of the surface element can be minimised.

One variant of the method according to the invention provides that during and/or after the welding, the embossing is incorporated at least in sections in the at least still viscous plastic connecting element so that no additional thermal loading is required for the surface element.

A surface of the connecting element available for connection to the surface of the surface element can be enlarged during and/or after welding and the enlargement of the surface can be executed during the embossing—this is advantageous with regard to the better load removal to a larger area.

Finally, in order to enlarge the surface, the connecting element can be heated at least as far as a viscous-plastic state. By this means, by pressing, for example, or by exerting mechanical force, a thinner and therefore less bulky incorporation of the connecting element into the surface element can be achieved and on the other hand, any positional correction can be achieved more easily.

The first part of the connecting device can be disposed on the side opposite to the surface element with the result that the projection surface is entirely available for observing the images projected thereon.

In order to utilise the projection surface of the surface element in the best possible manner, it can be provided that the first part of the connecting device is disposed in an edge zone of the surface element.

It is also possible that the surface element is larger than the surface described by the frame system, in particular projects beyond this surface at least in sections, with the result that on the one hand, a greater variability of the device is provided, for example, if the surface element is attached to different frame systems and on the other hand, a larger surface element allows an improved fastening possibility. According to a further development, it is provided that the segments of the surface element projecting beyond the surface at least in sections, at least partially enclose the frame system at least in sections, e.g. these are turned over outer edges of the frame system. An improvement in the previously described effect can be achieved by laminating the frame system with the surface element.

If these segments are held by the connecting device on the frame system, the device can be set up rapidly, particularly under pressure of time.

It can further be provided that the segments are held by the connecting device on the surface element. No additional connecting elements need to be used for the holding which makes handling or setting up substantially easier.

It is possible that the connecting device is configured as a press stud, clip, hook, Velcro closure, clip closure, push-in closure, split pin closure or the like, in which case a connecting device specially adapted thereto can be used for each surface element or for each case of application. It is naturally also possible to use different connecting devices within one system.

It order to further improve the handling, it can be provided that the connecting device is configured to be detachable.

If the connecting device is formed from at least two parts, wherein for example one part can be attached on the surface element and one part on the frame system, the separate storage or transport of more comprehensive connecting devices is not necessary. Setting up the device at the usage location can thereby be further accelerated.

As has already been described, the surface of segments of the surface element which project at least in section, can enclose the frame section at least in section, e.g. these can be wrapped around the outer edges of the frame system so that any manipulation effort can be reduced.

It can also be provided that connecting devices which differ from one another are provided. For example, in areas having higher tensile loading, for example, in the upper and lower frame area, connecting devices having higher resistance are used compared with, for example, at the sides of the frame system.

In particular, at least one opening can be disposed on the surface element, in particular in the edge zone which also allows attachment of the surface element to other or further frame systems.

A reinforcing element, preferably formed from a metal material, e.g. an eye, a ring and the like can be disposed on the surface element in the edge zone of the opening at least in sections. Any damage to the surface element, for example, due to ensuing stresses or the action of pressure or impact can thus be avoided.

It can be provided that at least one retaining and/or latching device is disposed on the frame system. This retaining and/or latching device makes it possible to attach the surface element rapidly and largely without the aid of connecting devices to the frame system as required. For example, the surface element can be fastened to the frame system similarly to a lorry canvas. The retaining and/or latching device can project through the opening at least in sections and thus largely prevent any change in position of the surface element. This type of attachment is particularly advantageous when using the device outside or in areas exposed to the weather.

As additional security, a securing device, for example, a pin, a split pin, can be disposed on a part projecting beyond the retaining and/or latching device after attachment of the surface element.

This projecting part can be configured to be ring-shaped or nose-shaped or hook-shaped, a mixture of the said shapes is also possible. If the surface element is elastic at least in sections, the attachment of the surface element on the projecting parts allows a largely smooth attachment or suspension of the surface element.

It can further be provided that the connecting device is disposed on the surface element rear side with the result that the connecting device can be attached in one operation during the production of the surface element.

Finally, it is possible that the surface element, in particular the segments, at least approximately completely enclose the frame system, e.g. this is pulled over the frame system, whereby preferably devices with a small projection area can rapidly be made ready for operation.

For a better understanding, the invention is explained in detail hereinafter with reference to the exemplary embodiments shown in the drawings.

In this figures, in each case in a highly schematically simplified representation.

It should first be noted that in the different embodiments described, the same parts are provided with the same reference numerals or the same component designation, wherein the disclosures contained in the entire description can be applied accordingly to the same part with the same reference numerals or the same component designations. The positional information selected in the description, such as, for example, above, below, laterally etc. are related to the figure which is being directly described and shown and in the event of change in position, can be applied accordingly to the new position. Furthermore, individual features or feature combinations from the different exemplary embodiments shown and described can themselves represent solutions which are independent, inventive or according to the invention.

All the information on the values ranges in the present description should be understood such that this also comprises arbitrary and all partial regions thereof, e.g. the information 1 to 10 should be understood in that all partial regions starting from the lower limit 1 and the upper limit 10 are also included, i.e. all partial regions begin with a lower limit of 1 or higher and end at an upper limit of 10 or lower, e.g. 1 to 1.7 or 3.2 to 8.1 or 5.5 to 10.

Figure 1:
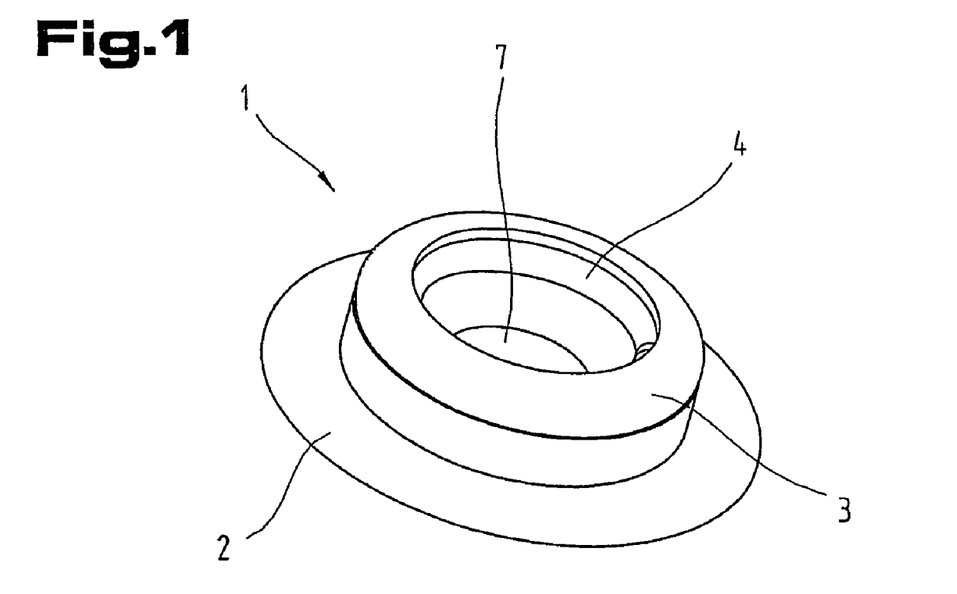
FIG. 1 shows a connecting device according to the invention.

FIG. 1 shows a connecting device 1 according to the invention which consists of at least one connecting element 2 as well as at least one latching part 3, wherein in this exemplary embodiment the latching part 3 is equipped with an interior engaging element, e.g. in the form of a spring ring 4. The connecting element 2 according to the invention consists of a weldable polymer, in particular of polyethylene, polypropylene, polyvinyl chloride, polymethylacrylate, polystyrene, acrylate ester, cellulose ester, polyamide, polycarbonate, a thermoplastic elastomer such as, for example, TPE as well as mixtures thereof.

The connecting element 2 is configured with a flat, brim-shaped edge which preferably projects laterally over the latching part. This edge of the connecting element 2 is used for the moulding-on, in particular for the welding, onto a surface element 5.

The edge can be part of the at least approximately cup-shaped connecting element 2 which is fastened to the latching part 3, wherein naturally according to the invention, the entire surface of this connecting element a 2 facing away from the latching part 3 can be used for welding to the surface element 5.

In this embodiment, the latching part 3 is preferably configured as the lower part of a press stud and in particular consists of a metal material. Subsequently, this latching part 3 can also be made of a plastic meeting the respective application-specific mechanical and thermal requirements.

Although the latching part 3 is configured with an at least approximately circular receiving region when considered in cross-section for a mating part engaging in the connecting device 1, this can, however, also have a rectangular, square, rhombic, elliptical or polygonal shape.

The spring ring 4 is inserted internally in the upper region of the latching part 3 and is used, as is generally known, for the non-positive engagement of an upper part, e.g. a press stud spherical part or another closure part, and usually consists of a metal material, in particular a bronze spring wire. This type of closure by annular springs is particularly suitable precisely when high requirements are imposed on the closing force, in particular when connecting surface elements 5 of plastic or textiles. Particularly, when the invention is applied in approximately perpendicular usage and the resulting different stress profile, a high closure force with high opening security under lateral pulling is advantageous. e.g. in the case of projection screens, canvases, advertising devices, screens.

Figure 2:
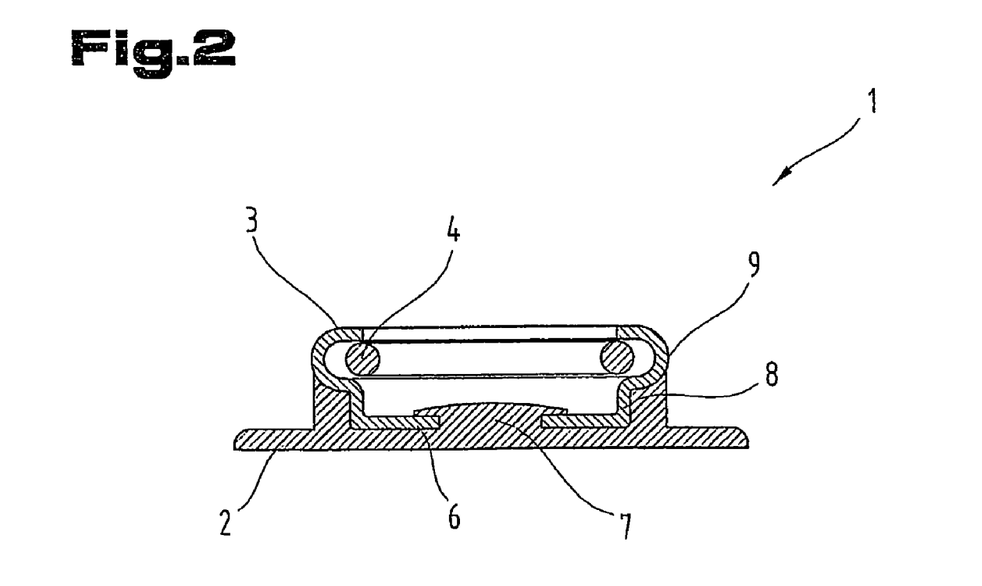
FIG. 2 shows a cross-section through a connecting device.

FIG. 2 shows the structure of this connecting device 1 in longitudinal section. A base 6 of the latching part 3 has an opening 7 in the form of a hole through which the connecting element 2 projects at least partially, and preferably projects beyond the base 6. Due to the distribution of the acting forces on a larger area, this projection of the connecting element 2 into or through the opening 7 brings about an improved load-bearing capacity compared with, for example, a punctuate connection in relation to tear-out strength, resistance to lateral pulling, impact and collision, especially when the connecting element 2 abuts positively against a side wall of the opening.

However, the opening 7 can also have a cross-sectional shape other than circular. Furthermore, it is possible that the side wall adjoining the opening 7 is configured to be stepped and that the connecting element 2 simulates this step shape in the area of the opening 7.

The latching part 3 has a side wall 8 preferably moulded on the base 6 which can extend perpendicularly away from the base 6 and is disposed on that surface of the base which lies opposite the surface on which the connecting element is fastened. This side wall 8 of the latching part 3 can have a protrusion 9, i.e. it can be configured to be stepped on its outer surface. The connecting element 2 can be configured in such a manner that it simulates this outer contour of the side wall 8. At the same time, it can be provided according to a preferred embodiment that the connecting element 2 does not project laterally beyond the side wall 8 or projects only partially beyond this so that the connecting element 2 only projects to a height in the area of the step. Due to these embodiments, a particularly flexible embedding for the latching part 3 with increased pulling-away strength of the connecting element 2 from the latching element 3 can be achieved wherein unintentional pulling away of the connecting element 2 when this is not connected to the base 6 and/or the at least one side wall 8 can be largely prevented by avoiding lateral projection.

It general, it should be noted that the latching part 3 can have more than one side wall 8 if this is designed, for example, not as a round press stud but as a latching part having a polygonal cross-section.

Figure 3:
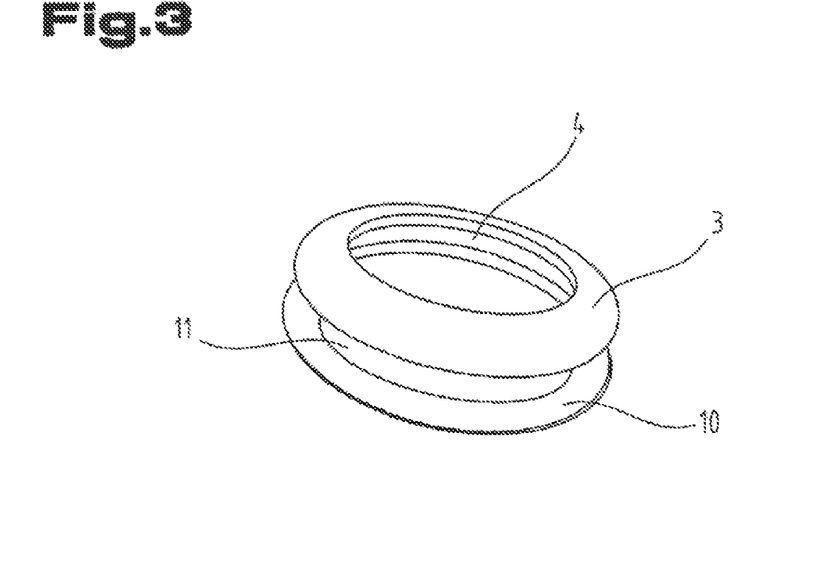
FIG. 3 shows an embodiment of the invention with a plate-shaped reinforcing element.
Figure 6:
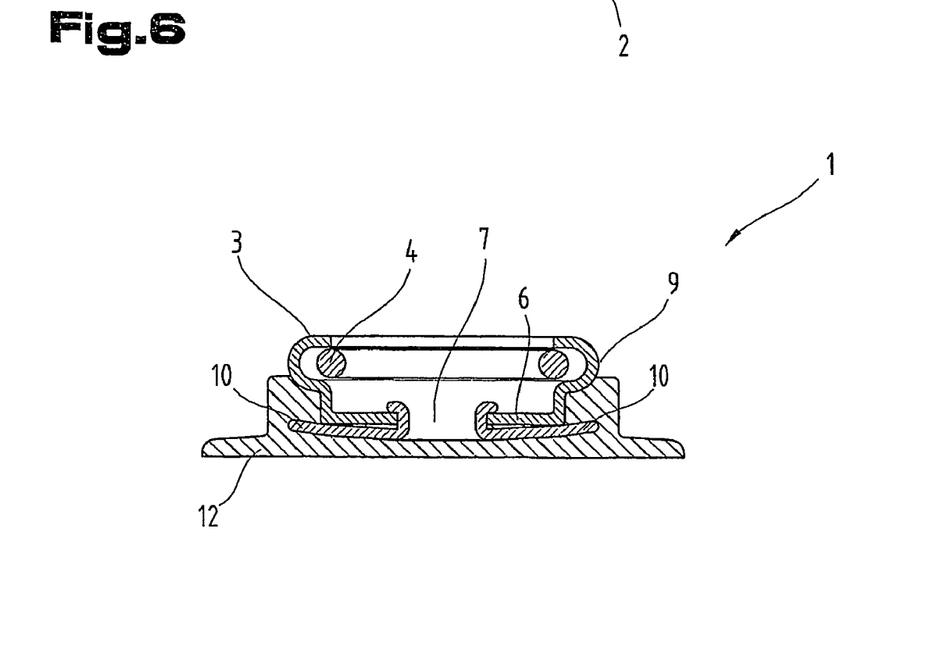
FIG. 6 shows a longitudinal section of a connecting device with reinforcing element embedded in an adapter piece.

FIG. 3 shows an embodiment of the invention in which an in particular plate-shaped reinforcing element 10 is disposed on the base 6 of the connecting device 1, in particular is connected to the base 6 (can be seen more clearly from FIG. 6). This reinforcing element 10 consists in particular of a metallic material and is connected non-positively to the latching part forming a distance-keeping groove-shaped recess 11. In this case, it is also found to be advantageous that in contrast to other riveted connections with press stud lower parts, a larger working surface is provided over which the acting forces, in particular tensile and shear forces can be better distributed.

Instead of the plate-shaped configuration, however, the reinforcing element 10 can also have any other suitable shape and can, for example, extend into the area of the side wall 8. At the same time, it is possible for this reinforcing element 10 to additionally have recesses or openings in which the connecting element 2 is fastened, for example, with mushroom-shaped extensions.

Figure 4:
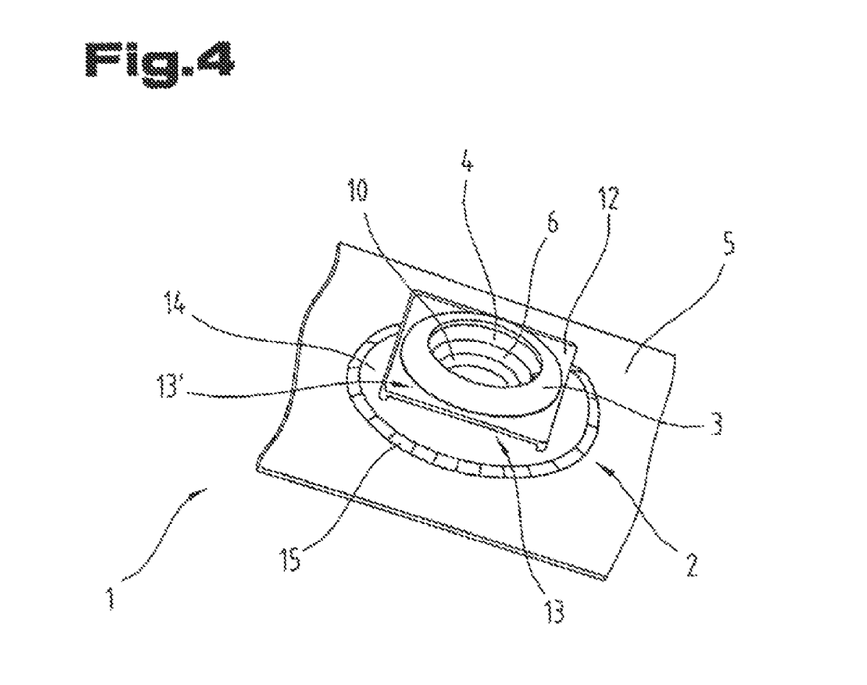
FIG. 4 shows an embodiment of the connecting device disposed on a surface element with an adapter piece.

FIG. 4 shows the arrangement of the connecting device 1 with plate-shaped reinforcing element 10 on the surface element 5, the connecting element 2 being connected to the base 6 and/or the side wall 8 with an interposed adapter piece 12. In the embodiment shown, the adapter piece 12 is made of a material, preferably a polymer, which has a higher hardness compared with the polymer of the connecting element 2. Naturally however, this adapter piece 12 can also consist of a material having at least similar mechanical properties, for example, the polymer of the connecting element 2 so that adapter piece 12 and connecting element 2 can be formed in one piece. Due to the adapter piece 12, an arrangement of the connecting element 2 at a distance from the base 6 of the latching part 3 is achieved so that alternative or additional fastening means can be arranged on the connecting device such as, for example, hooks, clips or the like. This is particularly advantageous when the surface element 5 is exposed to higher loadings and the connecting device 1 is merely used for positioning the surface element 5, e.g. on a frame such as, for example, a frame of a projection screen, or if no mating parts are provided on this frame such as, for example, press stud upper parts or spherical parts which cooperate with the latching part 3 of the connecting device 1, with the result that the surface element 5 can also be used with other fastening means in this last case.

An increased stressing of the adapter piece 12 by fastening means, e.g. clips, hooks which are inserted in a recess 13 formed by the spaced arrangement of the connecting element 2 from the base 6, is thereby possible, wherein at the same time a flexible and permanent connecting function is provided. This choice of material proves to be advantageous when using the connecting device 1 in areas exposed unprotected to the weather, e.g. in cold, heat, rain, snow, ice since no impairments due to corrosion, fracture, deformation or suddenly occurring material stress fluctuations are to be expected even during prolonged exposure. In addition, due to its material-specific elasticity such a connection is more wind-safe than the previously known metallic press stud connections corresponding to the prior art. This particularly applies to the use of projection screens or screens in open-air events or when used with large fluctuations in temperature and humidity. Naturally, usage over a prolonged period of time is also possible, e.g. in extensive permanent advertising equipment, in netting covers for scaffolding or in fixed awnings or canvases. It is also possible to use such connections, inter alia, in shoulder bags, school bags, hand bags and the like. These possible uses of the surface element 5 are naturally not restricted to the embodiment "adapter piece 12".

The adapter piece 12 may have at least one recess 13' shown in FIG. 4 in which the latching part 3 can be inserted, with the result that not only the connection between the latching part 3 and the adapter piece 12 can be improved but also the overall height of the connecting device 1 can be reduced or kept small. In addition, a saving of material in the connecting device 1 can thus be achieved.

The forming of the connecting element on a surface 14 of the surface element 5 can be further deduced from FIG. 4, wherein this forming on the surface 14 can preferably take place with an embossing 15 although this is not essential. In the present figure this embossing 15 is configured as knurling with radial webs but can also be designed in another expedient manner, e.g., annular, jagged, corrugated, punctuate or as a combination of different forms of embossing.

Figure 5:
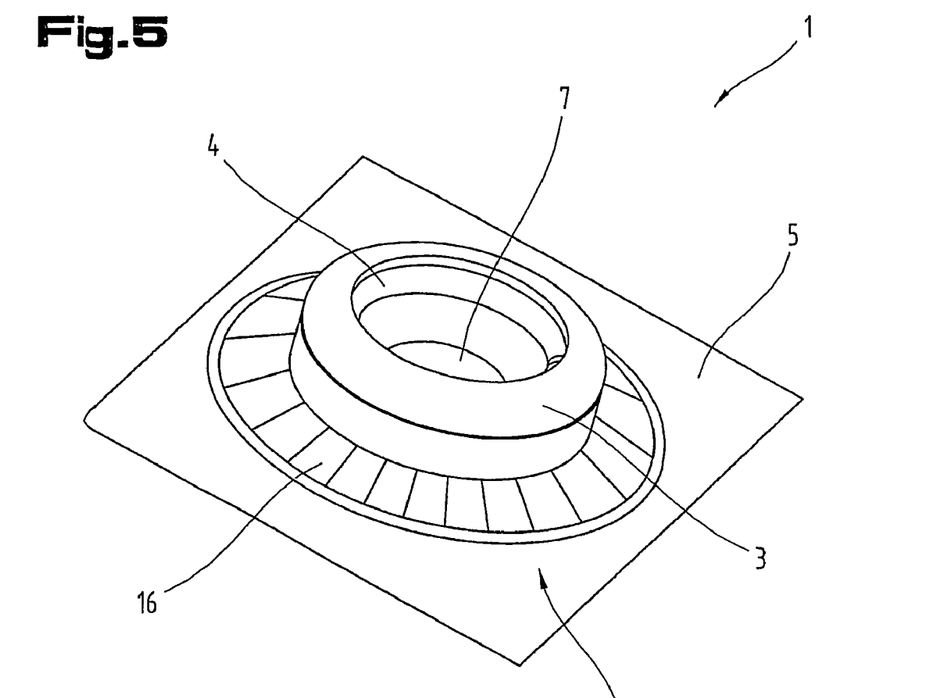
FIG. 5 shows the arrangement of a connecting device on a surface element.

FIG. 5 shows the arrangement of the connecting device 1 on the surface element 5 described in detail in FIG. 1. In this embodiment, the good and extensive connection of the surface element 5 to a connecting surface 15 can be seen. This gives rise to a wide spectrum of application of the invention for many materials, in particular screen fabrics, projection screens, screens, canvases and other surface structures having a surface of at least one plastic which can be welded to the material of the connecting element 2. Especially when used in projection screens and screens, the advantage comes to bear that due to the welding with the surface element 5, the connecting element 2 is invisible from the front and therefore to the observer of images projected thereon, which significantly enlarges the useable projection surface. In a further development, the connection method could also be used in sails, tent canvas, clothing etc.

Finally, it can be deduced from FIG. 6 how a further embodiment of a connecting device 1 disposed in the adapter piece can be designed. The longitudinal section shows a connecting device 1 shown in FIG. 3 with reinforcing element 10 which is configured in the manner of a "reinforcing brim". Due to the formation with the reinforcing element 10, a particularly high strength with respect to mechanical stresses is given as has been repeatedly described above. A part of the adapter piece 12 is disposed between the reinforcing element 10 and the latching part 3, wherein the dimensions, in particular the diameter, of the adapter piece 12 can be varied according to the required area of application. The adapter piece 12 can also project partially or completely through the opening 7 of the base 6—the present figure shows an embodiment in which this is not the case.

In the variant shown the connecting device is designed to be flatter than in FIG. 4 and is therefore less bulky in the respective practical usage. The actual overall height of the connecting device 1 can be adapted to different requirements by adaptations in the manufacture (e.g. applications inside or outside, wind-exposed uses, new types of, or standardised or non-standardised fastening means etc.).

According to a further embodiment, the connecting element 2 can not only project beyond the base 6 in the area of the opening but can also, for example, be designed as mushroom-shaped, i.e. the part of the connecting element 2 projecting beyond the base 6 can have a larger diameter than the diameter of the opening. This has the result that the connecting element 2 can be fastened to the base 6 of the latching part 3 merely by this engagement, i.e. additional connecting methods can be dispensed with.

It is furthermore for the adapter piece to be arranged at least partially engagingly in the groove-shaped recess between the base 6 of the latching part 3 and the reinforcing element 10 whereby an increased strength of the connecting device 1 can again be achieved here. The connecting element 2 can be provided with openings, e.g. holes in order to achieve inflow of the material of the surface element 5 into these openings during welding and thereby improved connection between the connecting element 2 and the surface element 5.

Furthermore, before welding, the connecting element 2 can be inserted in a pocket of the surface element 5 which can consequently be designed to be multilayered in this region so that as a result of the welding, a connection of the connecting element 2 at its lower and its upper surface to the surface element 5 and therefore an increased strength of the connection can be achieved.

To this end the connecting element 2 can, for example, have wing-like extensions which are in turn optionally provided with at least one opening in order to thus allow the penetration of the material of the surface element 5 into these openings. Such wing-like extensions can also be provided at the reinforcing element 10.

Since the welding of plastics is sufficiently known, in particular high-frequency welding, a discussion is superfluous at this point and the person skilled in the art is referred to the relevant literature.

However, it should be mentioned that it is possible to select the thickness of the connecting element 2 in such a manner that during welding a more extensive lateral trickling or expansion of the polymer is possible, the area of the connecting point is therefore enlarged so that he surface loading can be further reduced and thus the tear-out strength of the connecting device 1 can be increased.

Naturally it is also possible to dispose the press studs displaceably on or in the projection frame, as described in DE 20 2004 015 008 U1 and reference is therefore made at this point to this DE-U1 for the further disclosure.

Figure 7:
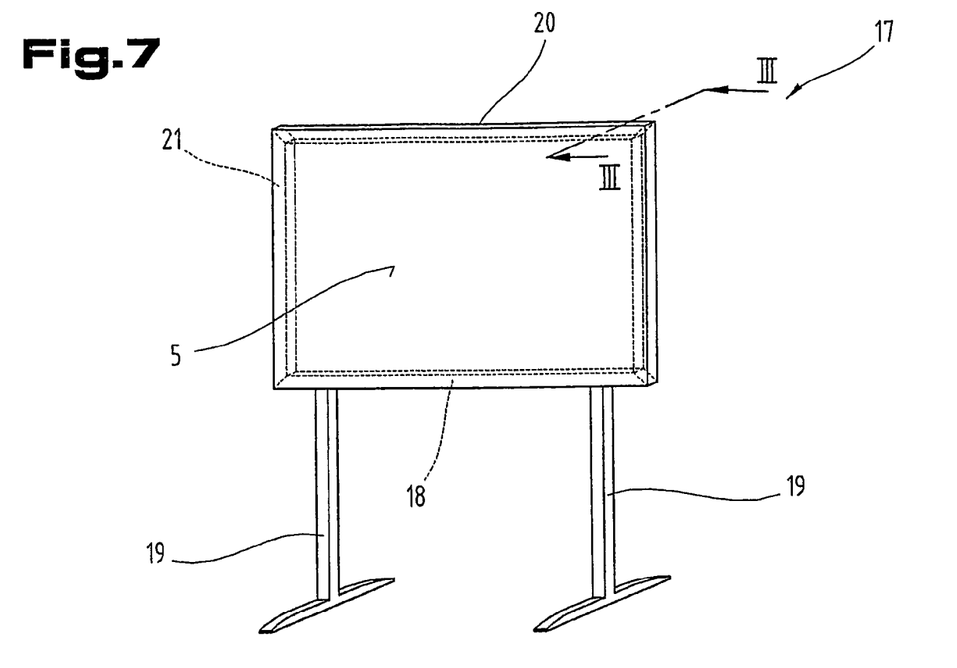
FIG. 7 shows an oblique view of a device according to the invention for reproducing projected images.

FIG. 7 shows in perspective view a device 17 consisting of the surface element 5 disposed on a frame system 18 (shown by the dashed line) and two supporting feet 19.

The surface element 5 can in particular be configured as a screen fabric, projection screen, screen, canvas and is preferably formed from plastic. In order, inter alia, to allow low-fatigue observation of the image, the surface element 5 can be coated at least in sections, for example, with a reflection-reducing coating. The colour of the surface element 5 is preferably selected to be light, for example, white, pale grey and the like in order to achieve reproduction of the images projected thereon with the highest possible colour fidelity.

The supporting feet 19 can be made of a metal material, preferably light metal, for example, aluminium but any other load-bearing material is also suitable for this purpose, preference being given to materials having the lowest possible weight with the highest possible stability or resistance. Corresponding stiffenings can also be provided.

The supporting feet 19 can be disposed on the underside in the lower area of the device 17, for example, at a distance from the perpendicular outer edges of the frame system 18. The supporting feet 19 can also be offset further outwards or inwards as shown. The supporting feet can also end laterally flush with the frame system 18.

The presence of the supporting feet 19 is not absolutely essential and the device 17 can also be attached, for example, to a wall, set up on an easel or the like, or designed as suspended from the ceiling. In order to achieve the greatest possible mobility of the device 17, the supporting feet 19 can also be provided with wheels, rollers and the like (not shown).

It is also possible to attach only one supporting foot 19 or a stand or three, four or more supporting feet 19—according to the requirements or circumstances of the erection site.

The frame system 18 can be formed from the same material as the supporting foot 19 but a material which differs from this can also be used. Likewise, different materials can also be used within the frame system 18, for example, fibreglass and light metal.

The frame system 18 consists of a plurality of profile elements 20, which are shown are arranged in rectangular shape. A rectangular shape (as shown) similar to many image or film formats can also be used for the frame system 18 but it is also possible for the individual profile elements 20 to have at least approximately the same length or for the frame system to be configured as square, trapezoidal or polygonal.

The present FIG. 7 shows a frame system front side 21.

Figure 8:
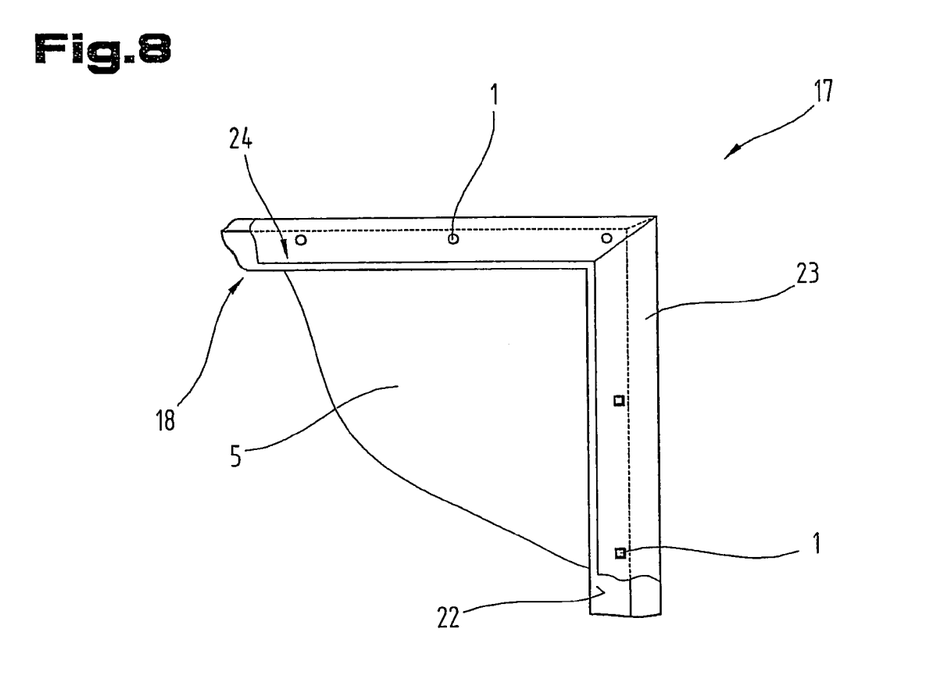
FIG. 8 shows a possible corner formation of the device.

FIG. 8 shows a section of the rearward view of the device 17 and shows how the surface element 5 is disposed or fastened on the frame system 18.

A plurality of connecting devices 1 or parts thereof are disposed on the frame system 18, in particular on a frame system rear side 22. These connecting devices 1 can be configured as described further above but differently shaped or configured connecting devices can also be attached. For example, press studs or Velcro fasteners can be used.

It can also be seen here that a frame system side surface 23 is completely covered by the surface element 5. In addition, it is also possible that the frame system side surface 23 is only partially covered or covered in sections, for example, ⅓, half or 70%.

The fastening of the surface element 5 on the frame system 18 is effected in such a manner that components of the connecting device 1 according to the invention or another such device are attached in an edge zone 24 of the surface element 5. Likewise, parts of the connecting device 1 are attached to the frame system rear side 22. The surface element 5 is now fastened to the frame system 18 by connecting the individual (component) parts of the connecting device 1.

As has already been mentioned, this fastening can be effected in a plurality of ways, and specifically by means of the connecting device 1 according to the invention with a press stud, a clip, a hook, a Velcro fastener, a clip closure, a push-in closure, a split-pin closure or the like. Displaceable connecting elements or systems which can be configured, for example, as fastenings running in a rail system can also be used.

When selecting a material for the surface element 5 which is elastic at least in parts, the positioning of the connecting devices I can be selected in such a manner that the surface element 5 rests tautly or free from folds on the frame system 18. As a result, the observer or the public is allowed a largely distortion-free view of the projected images.

The edge zone 24 can also be reinforced, e.g. by doubling in certain areas or by a greater material thickness, wherein the reinforcement can be provided by mechanical reforming, for example, embossing. This is indicated, for example, when the attachment of the connecting device 1 is made exclusively on the frame element side surfaces 23 to prevent any overstretching or tearing out of parts of the surface element, wherein the reinforcement is not absolutely essential, however, when attaching to the frame element side surfaces 23.

The arrangement of the connecting devices 1 can, as shown be made at regular intervals from one another but also in groups or irregularly. In particular, the spacings and/or the vertical or horizontal positioning with respect to one another can be specified or varied during manufacture. The frame system 18 and/or the surface element 5, for example, can also be provided with a predefinable system 18 at the factory and/or the surface element 5 can be provided with a predefinable grid of connecting devices 1 at the factory.

Figure 9:
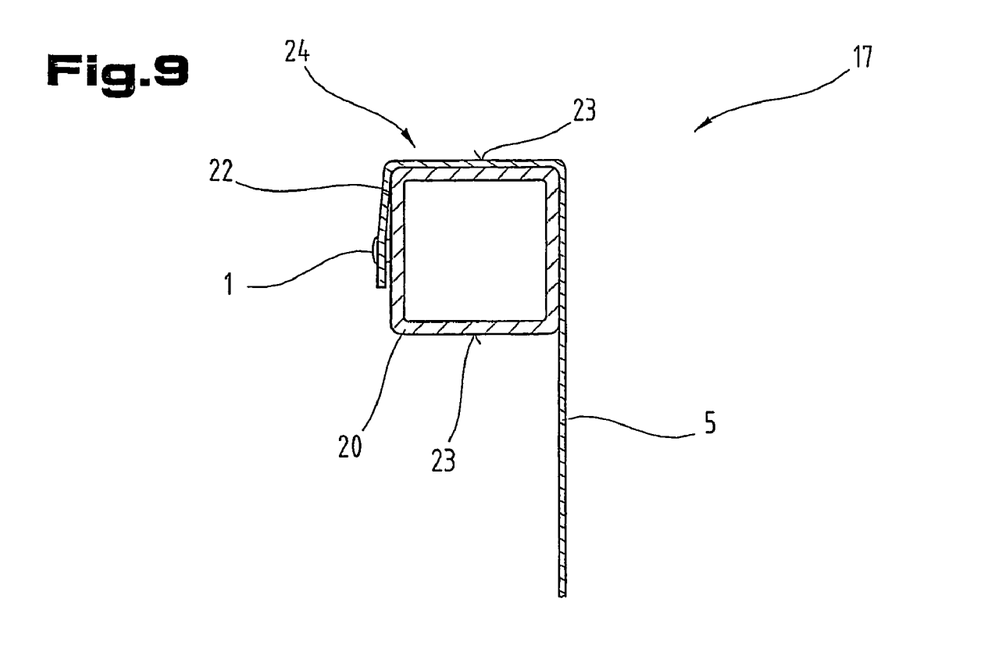
FIG. 9 shows a section through a profile element with surface element disposed thereon.
Figure 10:
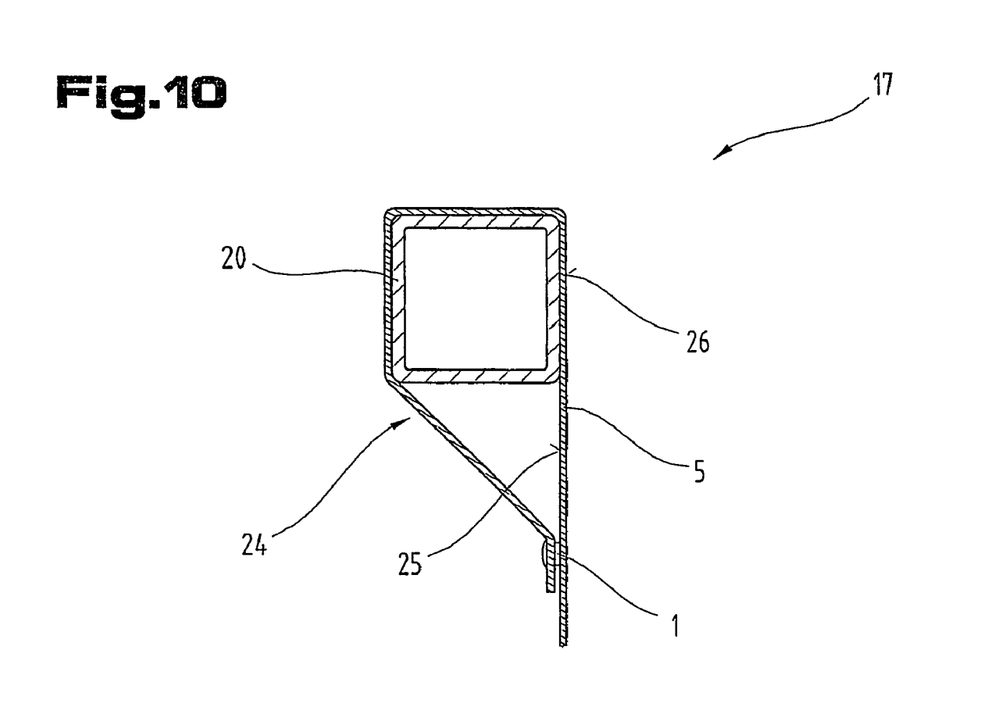
FIG. 10 shows a further section through a profile element with enclosing surface element.

FIGS. 9 and 10 finally each show a section through a part of the device 17 according to the invention.

FIG. 9 shows a profile element 20 in cross-section, here designed as a hollow profile, wherein, as already mentioned, other shapes or materials of the profile element can also be used. This profile element 20 is at least partially surrounded by a surface element 5.

The connecting device 1 is disposed on the frame system rear side 22 and in the edge zone 24 of the surface element 5. However, the connecting device 1 can also be located in the area of the frame system side surface 23 or be attached at other positions of the profile element 20, for example, in corner regions.

The profile element 20 can, however also have a cross-section differing from the present representation, for example, it can be configured to be polygonal, circular or rectangular. The wall thickness of the profile element 20 can be selected from the aspects of stability and durability, for example, it is appropriate to use thicker profile elements 20 in the case of greater support widths in the frame system.

The surface of the profile element 20 or the frame system 18 can be smooth but also profiled, grooved, or provided with guide rails.

Another possibility for holding is apparent from FIG. 10, where the profile element 20 is completely enclosed by the surface element 5. One part of the connecting device 1 is attached to a surface element rear side 25, the other part of the connecting device 1 is located in the edge zone 24 of the surface element 5. A fastening is possible as shown without parts of the connecting device 1 being visible on a surface element front side 26, also a plurality of connecting devices 1 can optionally (depending on the surface extension of the surface element 5) be attached adjacently or successively to impede any separation or tearing out of the surface element 5.

With the device 17 according to the invention, one and the same surface element 5 can be attached to different frame systems 18 or used for different-sized frame systems 18. This possibility for adjustment can be achieved by attaching a plurality of connecting devices 1 to the frame system 18 as well as surface element 5, for example, if the device 17 is configured according to FIG. 9 and according to FIG. 10, that is the connecting device 1 is attached to different fastening points.

If retaining and/or latching devices are attached to the frame system 18, which can be configured, for example, as pin- or hook-like, these retaining and/or latching devices can project through openings disposed in the edge zone 24 of the surface element 5 and thus hold the surface element 5 on the frame system 18.

The exemplary embodiments show possible embodiments of the connecting device 1, the surface element 5 as well as the device 17, wherein it should be noted at this point that the invention is not restricted to the specially depicted embodiments of the same type but rather various combinations of the individual embodiments are possible amongst one another and this scope for variation as a result of the teaching on the technical action by the present invention lies within the ability of the person skilled in the art working in this technical field. Therefore, all feasible embodiments which are possible by combining individual details of the embodiments shown and described are included within the scope of protection.

For the sake of good order, it should finally be noted that for a better understanding of the structure of the connecting device 1, the surface element 5 or the connecting device 17, these or their components have been shown partially not to scale and/or enlarged and/or reduced in size.

The object forming the basis of the independent inventive solutions can be deduced from the description.

In particular, the individual embodiments shown in the FIGS. 1, 2; 3; 4; 5; 6; 7; 8; 9; 10 form the subject matter of independent solutions according to the invention. The relevant object and solutions according to the invention can be deduced from the detailed description of these figures.

REFERENCE LIST

1 Connecting device
2 Connecting element
3 Latching part
4 Spring ring
5 Surface element
6 Base
7 Opening
8 Side wall
9 Protrusion
10 Reinforcing element
11 Recess
12 Adapter piece
13 Recess
14 Surface
15 Embossing
16 Connecting surface
17 Device
18 Frame system
19 Supporting foot
20 Profile element
21 Frame system front side
22 Frame system rear side
23 Frame system side surface
24 Edge zone
25 Surface element rear side
26 Surface element front side

The invention claimed is:

1. A projection screen for reproducing projected images comprising a surface and connecting devices disposed on the surface, wherein the surface comprises a plastic material, wherein the connecting devices are welded to the plastic material of the surface and each connecting device comprises a latching part having a base and at least one side wall disposed on the base, and a connecting element made of a weldable polymer disposed on the base and the at least one side wall, wherein the latching part is a press stud lower portion and is made up of a metal material, wherein the connecting element is at least approximately cup-shaped and is intergral with a flat base having a flat, brim-shaped edge which projects laterally over the latching part, wherein the connecting element is welded with the edge onto the surface to form a connection between the connecting element and the surface without punching the surface so that an opening in the surface is not caused by the connection, and wherein an entire surface of the connecting element facing away from the latching part is welded to the surface of the projection screen.

2. The screen according to claim 1, further comprising a tool-specific embossing on the surface of the projection screen.

3. The screen according to claim 1, wherein the base has at least one opening and the connecting element at least partly projects into said at least one opening.

4. The screen according to claim 3, wherein the connecting element projects through the at least one opening of the base and projects beyond the base toward the at least one side wall, wherein a part of the connecting element projecting beyond the base toward the side wall has a greater diameter than the at least one opening of the base.

5. The screen according to claim 1, wherein the at least one side wall has a protrusion and the connecting element fits partially with the side wall beneath the protrusion.

6. The screen according to claim 1, wherein a reinforcing element is disposed on the base of the press stud lower portion opposite to the at least one side wall.

7. The screen according to claim 6, wherein the reinforcing element is fastened on said base of the press stud lower portion partially at a distance from the base to form a groove-shaped recess.

8. The screen according to claim 7, wherein the connecting element comprises an adapter piece, and wherein the adapter piece is fastened in the groove-shaped recess between the base and the reinforcing element.

9. A device comprising a projection screen for reproducing projected images, said projection screen comprising a surface formed at least partially from a plastic material and having a surface element front side and a surface element rear side, and connecting devices welded to the plastic material of the surface, said device further comprising at least one frame system formed from profile elements, comprising a frame system front side, a frame system rear side and at least one frame system side surface, wherein each connecting device comprises a first part and a second part cooperating with the first part in a connected state, said second part being mounted on the at least one frame system and being disposed on at least one of the frame system rear side and the at least one frame system side surface, wherein said first part comprises a latching part and a connecting element, said latching part comprising a press stud lower portion made up of a metal material and having a base and at least one side wall disposed on the base, wherein said connecting element is made of a weldable polymer and is disposed on the base and the at least one side wall, wherein the connecting element is at least approximately cup-shaped and is intergral with a flat base having a flat, brim-shaped edge which projects laterally over the latching part, wherein the connecting element is welded with the edge onto the surface to form a connection between the connecting element and the surface without punching the surface so that an opening in the surface is not caused by the connection, and wherein an entire surface of the connecting element facing away from the latching part is welded to the surface of the projection screen.

10. The device according to claim 9, wherein the frame system comprises a frame system surface and at least sections of the projection screen project beyond the frame system surface.

11. A device comprising a projection screen for reproducing projected images, said projection screen comprising a surface formed at least partially from a plastic material and having a surface element front side and a surface element rear side, and connecting devices welded to the plastic material of the surface, said device further comprising at least one frame system formed from profile elements, comprising a frame system front side, a frame system rear side and at least one frame system side surface, wherein each connecting device comprises a first part and a second part cooperating with the first part in a connected state, wherein the first part is disposed on the surface element rear side and the second part is disposed at least partially on the surface element rear side, wherein said first part comprises a latching part and a connecting element, said latching part comprising a press stud lower portion made up of a metal material and having a base and at least one side wall disposed on the base, wherein said connecting element is made of a weldable polymer and is disposed on the base and the at least one side wall, wherein the connecting element is at least approximately cup-shaped and is intergal with a flat base having a flat, brim-shaped edge which projects laterally over the latching part, wherein the connecting element is welded with the edge onto the surface to form a connection between the connecting element and the surface without punching the surface so that an opening in the surface is not caused by the connection, and wherein an entire surface of the connecting element facing away from the latching part is welded to the surface of the projection screen.

* * * * *

UNITED STATES PATENT AND TRADEMARK OFFICE
CERTIFICATE OF CORRECTION

PATENT NO.       : 8,371,361 B2  
APPLICATION NO. : 11/921053  
DATED            : February 12, 2013  
INVENTOR(S)      : Reinhold Stumpfl Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this

First Day of September, 2015

Michelle K. Lee
*Director of the United States Patent and Trademark Office*